(12) United States Patent
Ayaki et al.

(10) Patent No.: US 8,311,220 B2
(45) Date of Patent: *Nov. 13, 2012

(54) AV DATA TRANSMISSION APPARATUS AND AV DATA TRANSMISSION METHOD

(75) Inventors: Yasushi Ayaki, Osaka (JP); Takuya Nishimura, Osaka (JP); Kazunari Fujiwara, Osaka (JP)

(73) Assignee: Panasonic Corporation, Osaka (JP)

( * ) Notice: Subject to any disclaimer, the term of this patent is extended or adjusted under 35 U.S.C. 154(b) by 608 days.

This patent is subject to a terminal disclaimer.

(21) Appl. No.: 12/420,947

(22) Filed: Apr. 9, 2009

(65) Prior Publication Data

US 2009/0257588 A1 Oct. 15, 2009

(30) Foreign Application Priority Data

Apr. 11, 2008 (JP) .................................. 2008-103974

(51) Int. Cl.
*G06F 21/00* (2006.01)
(52) U.S. Cl. .......................... 380/212; 380/210; 380/213
(58) Field of Classification Search ................... 380/212
See application file for complete search history.

(56) References Cited

U.S. PATENT DOCUMENTS

| | | | | |
|---|---|---|---|---|
| 5,822,528 | A * | 10/1998 | Amano | 725/103 |
| 6,981,272 | B1 | 12/2005 | Morinaga et al. | |
| 2002/0167972 | A1 * | 11/2002 | Okamoto | 370/537 |
| 2003/0145336 | A1 * | 7/2003 | Matsuzaki et al. | 725/136 |
| 2004/0034787 | A1 * | 2/2004 | Kitani | 713/189 |
| 2004/0068655 | A1 * | 4/2004 | Nishimura et al. | 713/171 |
| 2004/0250101 | A1 * | 12/2004 | Kanai | 713/193 |
| 2006/0109982 | A1 * | 5/2006 | Puiatti et al. | 380/200 |
| 2007/0124821 | A1 * | 5/2007 | Saito | 726/27 |
| 2007/0280302 | A1 * | 12/2007 | Okamoto | 370/535 |

FOREIGN PATENT DOCUMENTS

| | | |
|---|---|---|
| JP | 2005-175709 | 6/2005 |
| WO | 00/44170 | 7/2000 |

OTHER PUBLICATIONS

Espacenet search Results, Espacenet Result List, Jul. 2011.*
DTCP-IP, Digital Transmission Content Protection Specification vol. 1, Oct. 2007.*
Digital Transmission Content Protection Specification Revision 1.51 (Informational Version), pp. 1-82, Oct. 2007.

* cited by examiner

*Primary Examiner* — Taghi Arani
*Assistant Examiner* — Shan Elahi
(74) *Attorney, Agent, or Firm* — Wenderoth, Lind & Ponack, L.L.P.

(57) ABSTRACT

Provided is an AV data transmission apparatus including two or more output channels, an encryption unit encrypting AV data using an encryption key, and an AV data transmission unit transmitting the encryption key and the encrypted AV data to AV data reception apparatuses from each output channel. The apparatus also includes an encryption key switching unit switching an encryption key generation scheme to another one for the encryption key transmitted through a selected output channel, an output suspension unit suspending output of the encrypted AV data transmitted through a selected output channel, and a control unit (i) causing the output suspension unit to select an output channel and suspend the output of the encrypted AV data through the selected output channel, and then (ii) causing the encryption key switching unit to select the same output channel and switch the encryption key generation scheme to another one for the output channel.

5 Claims, 6 Drawing Sheets

AV DATA TRANSMISSION APPARATUS AND AV DATA TRANSMISSION METHOD

BACKGROUND OF THE INVENTION (1) Field of the Invention

The present invention relates to an AV data transmission apparatus and an AV data transmission method, and particularly to an AV data transmission apparatus and an AV data transmission method for encrypting AV data added with usage control information and transmitting the encrypted AV data.

(2) Description of the Related Art

In recent years, a home network that connects home appliances for sharing various contents is on the way to its implementation. Meanwhile, when handling data which is added with usage control information and requires copyright protection, such as newly released movies, pay-TV programs, and music, it is necessary to provide a processing unit that protects copyrights. An effective method for protecting copyrights is to encrypt data that requires copyright protection and to transmit the encrypted data, as well as protected usage control information of the data. This way, unauthorized use of the data is prevented.

A Digital Transmission Content Protection (DTCP) specification is an example of such a copyright protection method in practical use.

In the DTCP specification, an AV data transmission apparatus and an AV data reception apparatus perform authentication and key exchange by an Authentication and Key Exchange (AKE) command so as to share an exchange key (Kx). The AV data transmission apparatus generates a content key (Kc) by using the exchange key (Kx), an encryption mode (EMI), and a key seed (Nc), and uses the content key as an encryption key. The AV data transmission apparatus encrypts AV data using the encryption key generated, and transmits the encrypted AV data.

Further, the AV data transmission apparatus stores the encryption mode (EMI) and the least significant bit of the key seed (Nc) in the header of a packet in which AV data is transmitted, and transmits the packet to the AV data reception apparatus. The key seed (Nc) itself is transmitted to the AV data reception apparatus by the AKE command.

The AV data reception apparatus generates a content key (Kc) by using the Kx shared through the authentication and key exchange, and the EMI and the Nc received from the AV data transmission apparatus, and uses the content key as a decryption key. The AV data reception apparatus performs decryption using the decryption key generated.

Further, the DTCP specification defines, as usage control information for copy generation management of AV data, "Copy Free", "Copy One Generation", "No More Copies", and "Copy Never". The AV data transmission apparatus transmits usage control information in association with an encryption mode (EMI), and the AV data reception apparatus manages data use (copy control) based on the encryption mode (EMI).

Further, information such as Image Constrain Token for restricting resolution is defined as usage control information which is followed when AV data received by the AV data reception apparatus is outputted as analog signals. The usage control information is stored in a DTCP descriptor (DTCP_descriptor) and embedded in the AV data so as to be transmitted (Non-Patent Reference 1: Digital Transmission Content Protection Specification Revision 1.51 (Informational Version)).

With such a copyright protection method in relation to AV data transmission, it is necessary to prevent unauthorized use that does not adhere to the usage control information. As a method to reliably prevent unauthorized use of AV data, usage control information and an encryption key are associated with each other so that in the case of unauthorized use, encrypted AV data cannot be decrypted.

For example, in the case of moving AV data, reception and recording of the AV data needs to be restricted only to a particular AV data reception apparatus. In this case, by discarding the exchange key (Kx), and switching it to a new one, the AV data transmission apparatus restricts generation of a new encryption key using the new exchange key and decryption of AV data only to the particular AV data reception apparatus. This way, unauthorized copying by other AV data reception apparatuses is prevented.

Further, by switching the encryption key generation scheme to a different one depending on the usage control information, the AV data transmission apparatus disables AV data decryption so that unauthorized data use is prevented even when the usage control information is tampered with during AV data transmission.

However, with AV data transmission according to a conventional copyright protection specification, the following problem arises in the case where the AV data transmission apparatus simultaneously outputs AV data to two or more destinations through corresponding output channels.

Here, in relation to a conventional copyright protection specification, a description shall be provided of the operation of an AV data transmission apparatus which simultaneously outputs AV data to two or more destinations through corresponding output channels.

FIG. 6 illustrates the operation of switching an encryption key to a different one by switching an exchange key to a different one in AV data transmission according to a conventional copyright protection specification. FIG. 6 illustrates the operation of switching an encryption key to a different one by switching an exchange key to a different one in AV data transmission between an AV data transmission apparatus 101 and AV data reception apparatuses 102 and 103.

The AV data transmission apparatus 101 initially encrypts AV data whose usage control information indicates "MOVE", using an encryption key of an encryption key generation scheme "encryption key type 1", and outputs the encrypted AV data to both destinations through corresponding output channels 1 and 2.

Next, the AV data reception apparatus 102, which is the destination 1, obtains an exchange key through authentication and key exchange, and obtains encryption key information (encryption key type 1 in this case). The AV data reception apparatus 102 generates a decryption key from the obtained encryption key information and starts decryption (S601 to S605).

Here, the AV data reception apparatus 103, which is the destination 2, requests authentication and key exchange. However, since the authentication and key exchange is already performed between the AV data transmission apparatus 101 and the AV data reception apparatus 102, the AV data transmission apparatus 101 rejects the request for authentication and key exchange. Since the request for authentication and key exchange is rejected, the AV data reception apparatus 103 displays "decryption unable" (S606 to S608).

Next, when the usage control information of the AV data is switched from "MOVE" to "Copy One Generation", the AV data transmission apparatus 101 suspends all the outputs because switchover of the exchange key is prohibited during AV data transmission according to the DTCP specification. Then, the AV data transmission apparatus 101 changes the exchange key to switch the encryption key to a different one, starts encryption (S609 to S610), and resumes AV data transmission to both of the destinations through corresponding output channels.

Next, upon detecting that the input of AV data has been suspended, the AV data reception apparatuses 102 and 103, which are the two destinations of the output channels, determine that the AV data transmission apparatus 101 may have updated the exchange key. After the AV data transmission apparatus 101 resumes the transmission, the AV data reception apparatuses 102 and 103 execute authentication and key exchange, and obtain a new exchange key and encryption key information. The AV data reception apparatuses 102 and 103 generate a decryption key from the obtained encryption key information, and starts decryption (S611 to S616 and S617 to S622).

FIG. 7 illustrates the operation of switching between the types of encryption key used at each output channel in AV data transmission according to a conventional copyright protection specification. FIG. 7 illustrates the operation of switching between the types of encryption key used at each output channel in AV data transmission between the AV data transmission apparatus 101 and AV data reception apparatuses 102 and 104. Here, the AV data reception apparatus 104 illustrated in FIG. 7 does not support new usage control information stored in the packet header of an AV data packet. In other words, the AV data reception apparatus 104 is an existing AV data reception apparatus that cannot detect a switchover of encryption key generation schemes.

The AV data transmission apparatus 101 initially encrypts AV data whose usage control information indicates "analog output prohibited", using an encryption key of an encryption key generation scheme "encryption key type 2" that is not supported by the existing AV data reception apparatus 104, and outputs the encrypted AV data to both destinations through corresponding output channels 1 and 2.

Next, the AV data reception apparatus 102, which is the destination of the output channel 1, obtains an exchange key through authentication and key exchange, and obtains encryption key information through a command response (encryption key type 2 in this case). The AV data reception apparatus 102 generates a decryption key from the encryption key information obtained, and starts decryption (S701 to S705).

Here, the AV data reception apparatus 104, which is the destination of the output channel 2, obtains an exchange key through authentication and key exchange. Then, through a command response in response to an encryption-key-information request command, the AV data reception apparatus 104 verifies that the encryption key generation scheme is not "encryption key type 1" supported by the AV data reception apparatus 104, and thus displays "decryption unable" (S706 to S710).

Next, when the usage control information of the AV data is switched from "analog output prohibited" to "analog output permitted", the AV data transmission apparatus 101 switches the encryption key used at both output channels to an encryption key of the encryption key generation scheme "encryption key type 1" that is supported by both of the AV data reception apparatuses (the AV data reception apparatuses 102 and 104) (S711).

Based on usage control information stored in the packet header of an AV data packet received, the AV data reception apparatus 102 detects the switchover of the encryption key generating schemes, and thus switches the decryption key to a different one according to the usage control information (S712) and continues with the decryption. On the other hand, the AV data reception apparatus 104 cannot recognize the usage control information stored in the packet header of an AV data packet received, and is thus incapable of detecting that the decryption is now possible. As a result, it cannot start the decryption.

As described above, with the AV data transmission according to the conventional copyright protection specification, the following problem arises in the case where the AV data transmission apparatus simultaneously outputs AV data to two or more destinations through corresponding output channels.

In the case of switching an encryption key to a different one by changing an exchange key, it is necessary to suspend the AV data output through all the output channels to all the destinations, because switchover of exchange keys is prohibited during AV data transmission. For this reason, the AV data transmission apparatus which simultaneously outputs AV data to plural destinations through plural output channels is required to suspend even the output to the destination for which the encryption key switchover is unnecessary.

Furthermore, in the case of switching among encryption key generation schemes, the existing AV data reception apparatus cannot recognize new usage control information, and is thus incapable of detecting a switchover of encryption key generation schemes, resulting in that the existing AV data reception apparatus cannot start decryption even when the encryption key generation scheme has been switched to a different one which allows decryption.

SUMMARY OF THE INVENTION

The present invention has been conceived in view of the above circumstances, and an object of the present invention is to provide an AV data transmission apparatus and an AV data transmission method that allow an AV data reception apparatus which does not detect a switchover of an encryption key generation scheme to a different one that permits decryption, to start decryption.

In order to solve the above described problems, the AV data transmission apparatus of the present invention is an AV data transmission apparatus which has two or more output channels and transmits encrypted AV data to AV data reception apparatuses each of which corresponds to one of the output channels, the AV data transmission apparatus comprising: an encryption unit configured to encrypt AV data using an encryption key; an AV data transmission unit configured to transmit the encrypted AV data to the AV data reception apparatuses through each of the output channels; an encryption key switching unit configured to select at least one of the output channels, and to switch an encryption key generation scheme to another encryption key generation scheme to generate another encryption key used for encrypting the AV data to be transmitted through the selected output channel; an output suspension unit configured to select at least one of the output channels, and to suspend output of the encrypted AV data transmitted through the selected output channel; and a control unit configured to cause (i) the output suspension unit (i-a) to select, from among the output channels, an output channel for which the encryption key generation scheme is to be switched to another encryption key generation scheme, and (i-b) to suspend the output, through the selected output channel, of the AV data which has been encrypted using the encryption key, and then to cause (ii) the encryption key switching unit (ii-a) to select the output channel selected by the output suspension unit, and (ii-b) to switch the encryption key generation scheme to another encryption key generation scheme to generate another encryption key to encrypt the AV data for the selected output channel.

This structure makes it possible to switch the encryption key generation scheme to a different one after suspending the output through the output channel for which the encryption key generation scheme is to be switched. This makes it possible to provide an AV data transmission apparatus that allows an AV data reception apparatus which does not detect a switchover of an encryption key generation scheme to one that permits decryption, to start decryption.

Here, it may be that the control unit is configured to (i) cause the output suspension unit to suspend the output of the AV data, which has been encrypted using the encryption key, through the selected output channel for which the encryption key generation scheme is to be switched to another encryption key generation scheme, and then (ii) disconnect from one of the AV data reception apparatuses which corresponds to the selected output channel.

It may be that the AV data transmission apparatus further comprises a function verification unit configured to verify whether or not the AV data reception apparatuses have a detection function to detect that the encryption key generation scheme has been switched to another encryption key generation scheme, wherein, when the function verification unit verifies that one of the AV data reception apparatuses has the detection function, the control unit is configured to cause the output suspension unit not to suspend the output of the encrypted AV data through one of the output channels which corresponds to the AV data reception apparatus having the detection function.

This structure enables a switchover of an encryption key to a different one without suspending output through the output channel for which an encryption key switchover is unnecessary, and enables an AV data reception apparatus which does not detect a switchover of an encryption key generation scheme to one that permits decryption, to start decryption.

The present invention provides an AV data transmission apparatus and an AV data transmission method that allow an AV data reception apparatus which does not detect a switchover of an encryption key generation scheme to one that permits decryption, to start decryption. In addition, the present invention provides an AV data transmission apparatus and an AV data transmission method that allow a switchover of an encryption key to a different one without suspending output through an output channel for which an encryption key switchover is unnecessary. More specifically, when an encryption key is changed to one which allows decryption, decryption can be started for the following reasons: since the exchange key is not updated, an encryption key can be switched to a different one without suspending the output through the output channel for which an encryption key switchover is unnecessary; and suspension of output allows even the existing AV data reception apparatus to be notified that the encryption key may have been changed.

FURTHER INFORMATION ABOUT TECHNICAL BACKGROUND TO THIS APPLICATION

The disclosure of Japanese Patent Application No. 2008-103974 filed on Apr. 11, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Hereinafter, an embodiment of the present invention shall be described with reference to the drawings.

Embodiment

Figure 1:
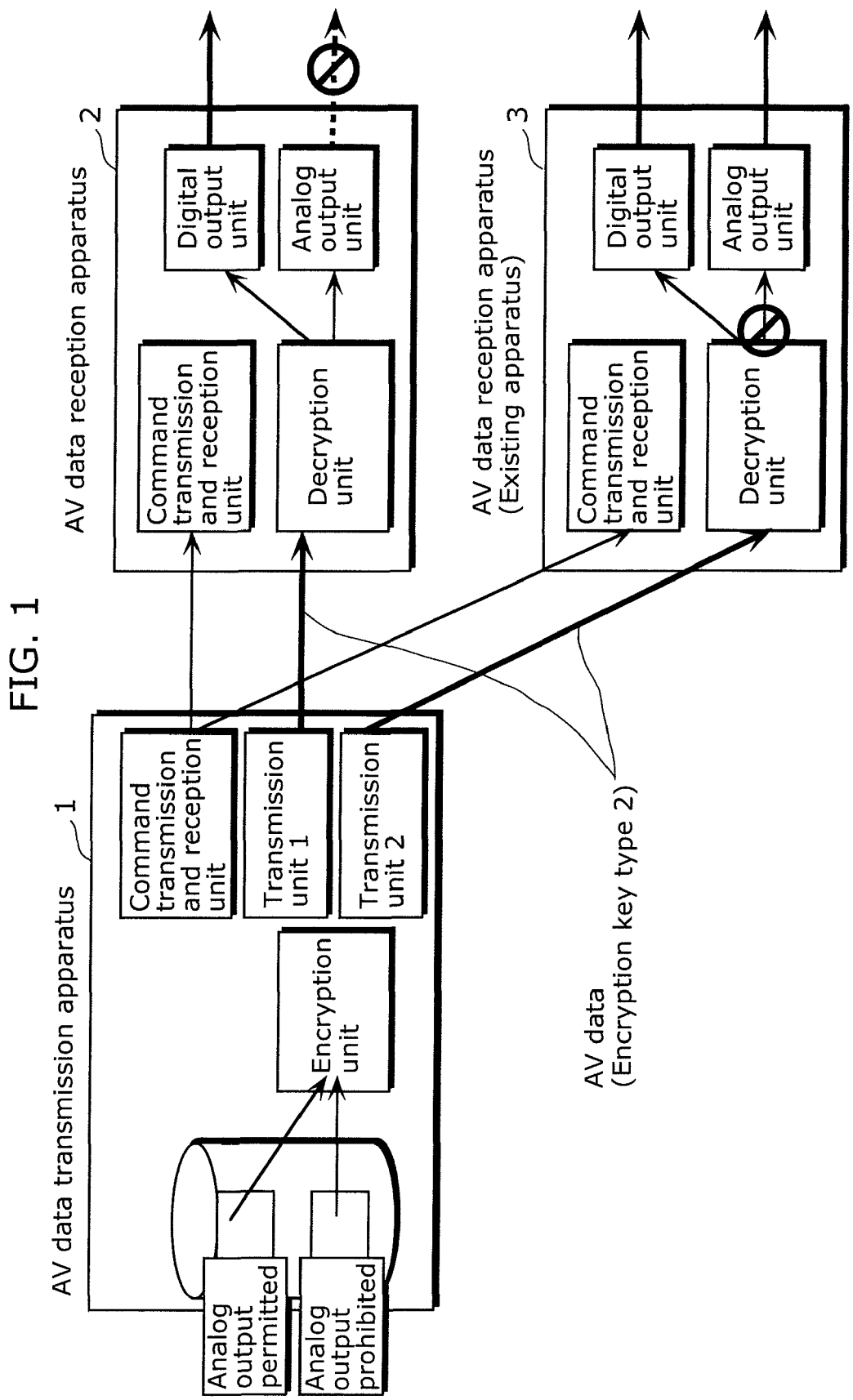
FIG. 1 illustrates a state where an AV data transmission apparatus according to an embodiment of the present invention is connected with AV data reception apparatuses via a network.

FIG. 1 illustrates a state where an AV data transmission apparatus of the present embodiment is connected with AV data reception apparatuses via a network.

In FIG. 1, an AV data reception apparatus 2 can detect that an encryption key generation scheme has been changed to "encryption key type 2", based on usage control information indicating "analog output prohibited" and stored in the packet header of an AV data packet received. Further, the AV data reception apparatus 2 controls analog output based on usage control information. On the other hand, an AV data reception apparatus 3 is an existing AV data reception apparatus that cannot recognize usage control information indicating "analog output prohibited" and stored in the packet header of an AV data packet received, and it is incapable of recognizing a switchover among encryption key generation schemes. The AV data reception apparatus 3 cannot decrypt AV data which has been encrypted according to "encryption key type 2", because it does not support the encryption key generation scheme of "encryption key type 2".

<Structure of AV Data Transmission Apparatus>

In FIG. 1, an AV data transmission apparatus 1 is connected with the AV data reception apparatuses 2 and 3 via a home network of IEEE 1394. The AV data transmission apparatus 1 reproduces AV data recorded on a Hard Disk Drive (HDD), encrypts the AV data, and transmits the encrypted AV data to the AV data reception apparatuses 2 and 3.

Figure 2:
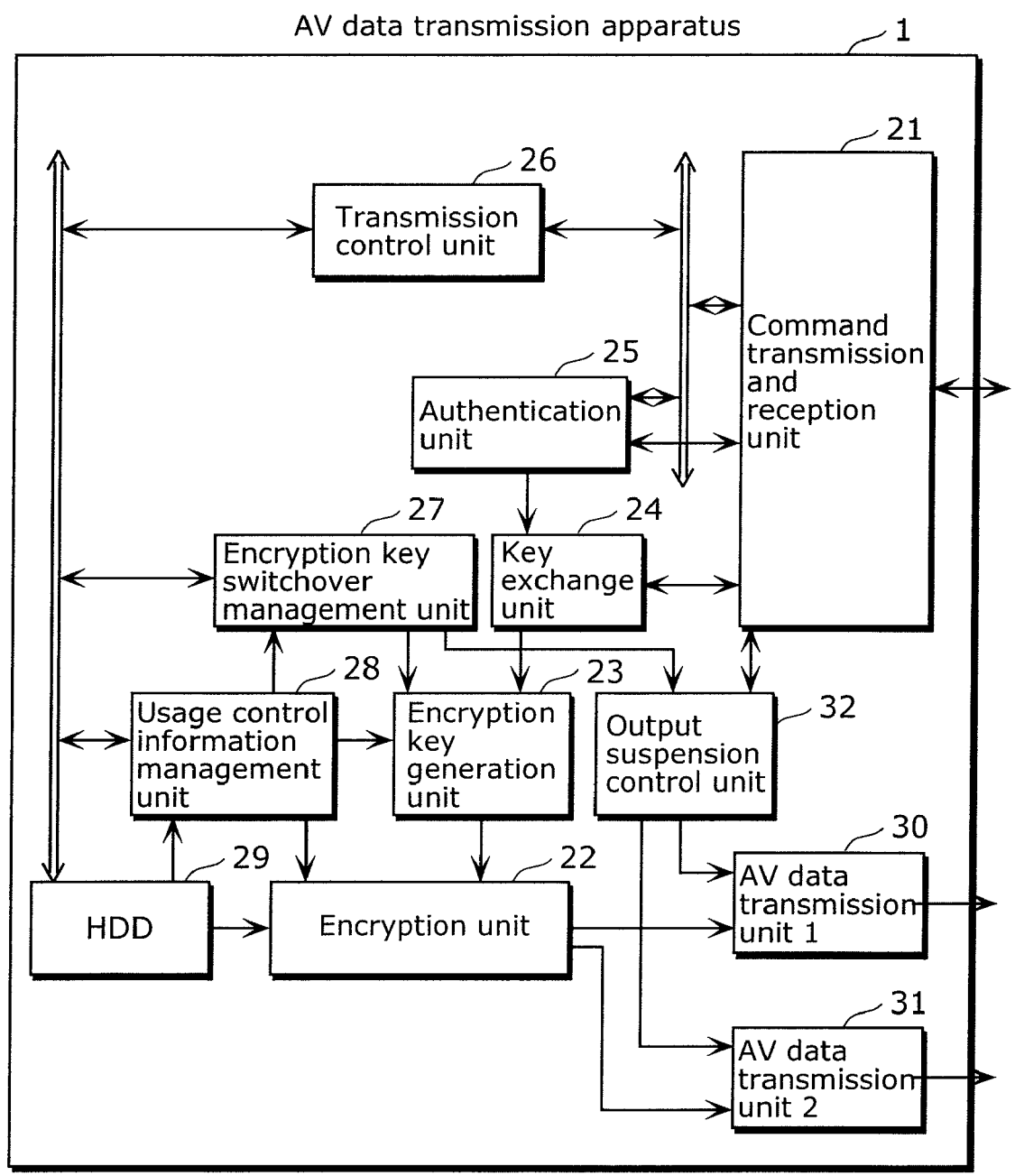
FIG. 2 illustrates the structure of an AV data transmission apparatus according to an embodiment of the present invention.

FIG. 2 illustrates the structure of the AV data transmission apparatus 1.

The AV data transmission apparatus 1 includes a command transmission and reception unit 21, an encryption unit 22, an encryption key generation unit 23, a key exchange unit 24, an authentication unit 25, a transmission control unit 26, an encryption key switchover management unit 27, a usage control information management unit 28, an HDD 29, AV data transmission units 30 and 31, and an output suspension control unit 32.

The command transmission and reception unit 21 is a digital interface for transmission and reception of AKE commands and AKE command responses via the network.

The encryption unit 22 corresponds to the encryption unit of the present invention. For each of two output channels, the encryption unit 22 encrypts AV data reproduced from the HDD 29, using an encryption key (Kc) received from the encryption key generation unit 23, and packetizes the encrypted AV data. Further, the encryption unit 22 assigns, to the packetized AV data, a packet header in which an EMI and an Nc (least significant bit) received from the encryption key generation unit 23 are stored, and outputs the resulting AV data to the AV data transmission units 30 and 31. Furthermore, the encryption unit 22 embeds usage control information received from the usage control information management unit 28 in the AV data by storing the usage control information in a DTCP descriptor.

Figure 3:
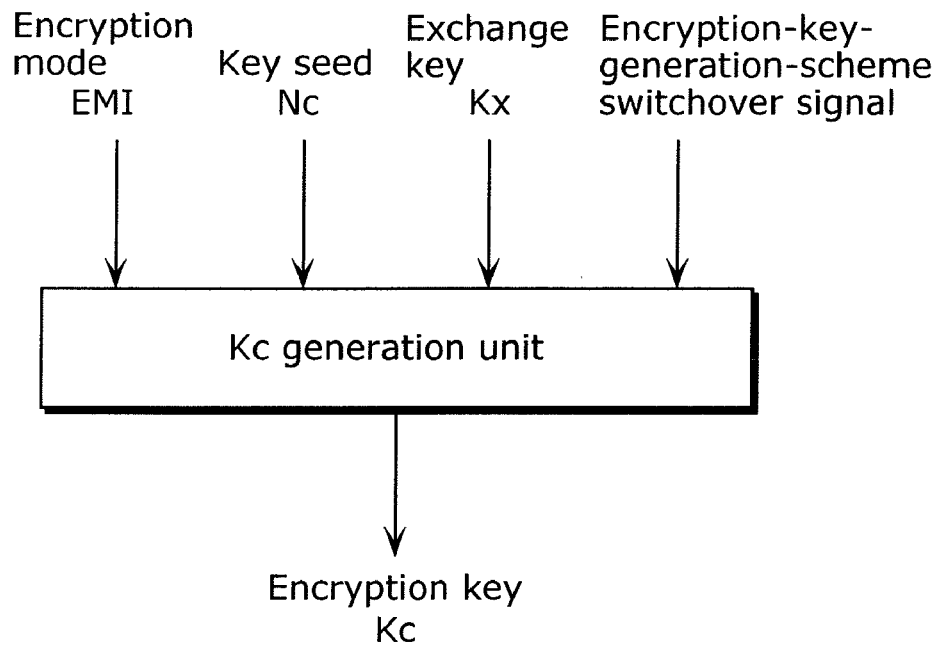
FIG. 3 illustrates information inputted to and outputted from a Kc generation unit of an encryption key generation unit according to an embodiment of the present invention.

The encryption key generation unit 23 is controlled by the transmission control unit 26, and includes a Kc generation unit. The encryption key generation unit 23 generates an encryption key for each of the two output channels via the Kc generation unit as shown in FIG. 3, by using: an exchange key (Kx) received from the key exchange unit 24; an encryption-key-generation-scheme switchover signal received from the encryption key switchover management unit 27; an encryption mode (EMI) associated with copy control information; and a key seed (Nc) received from the transmission control unit 26. The encryption key generation unit 23 outputs the encryption keys, generated by the Kc generation unit, of the respective two output channels to the encryption unit 22. Further, the encryption key generation unit 23 also outputs the EMI and Nc (least significant bit) assigned to the packet header to the encryption unit 22.

Here, FIG. 3 illustrates information inputted to and outputted from the Kc generation unit of the encryption key generation unit 23.

The key exchange unit 24 generates an exchange key (Kx) to be used by the AV data reception apparatuses 2 and 3 for decrypting the encrypted AV data, encrypts the generated exchange key (Kx) using authentication information (Kauth) received from the authentication unit 25, and outputs the resultant via the command transmission and reception unit 21.

The authentication unit 25 is controlled by the transmission control unit 26, and executes authentication upon receiving an authentication start request command from the AV data reception apparatus 2 or 3, and shares authentication information (Kauth) with the AV data reception apparatus 2 or 3. The authentication unit 25 outputs the shared authentication information (Kauth) to the key exchange unit 24.

The transmission control unit 26 controls the command transmission and reception unit 21, the encryption key generation unit 23, the authentication unit 25, the encryption key switchover management unit 27, the HDD 29, and the usage control information management unit 28 so that AV data is encrypted and transmitted through each of the two output channels.

The encryption key switchover management unit 27 corresponds to the encryption key switching unit of the present invention. The encryption key switchover management unit 27 is controlled by the transmission control unit 26, and outputs an encryption-key-generation-scheme switchover signal to the encryption key generation unit 23 according to the usage control information received from the usage control information management unit 28. At the same time, the encryption key switchover management unit 27 switches the encryption key information to a different one (encryption key type 1 or encryption key type 2), and transmits the resultant to the AV data reception apparatuses 2 and 3 via the command transmission and reception unit 21.

The usage control information management unit 28 is controlled by the transmission control unit 26, and generates an EMI based on usage control information received from the HDD 29, such as copy control information and output control information associated with AV data transmitted through each output channel. The usage control information management unit 28 then outputs the EMI to the encryption key generation unit 23. Further, the usage control information management unit 28 outputs the usage control information to the encryption key switchover management unit 27. It also outputs the usage control information to the encryption unit 22 to be stored in a DTCP descriptor.

The HDD 29 is a recording and reproduction unit that stores AV data and usage control information associated with the AV data, and is controlled by the transmission control unit 26. Further, the HDD 29 outputs, to the encryption unit 22, AV data to be transmitted through each output channel, and outputs usage control information to the usage control information management unit 28.

The AV data transmission units 30 and 31 correspond to the AV data transmission unit of the present invention. They are controlled by the output suspension control unit 32 and are digital interfaces for transmitting encrypted AV data to the network.

The output suspension control unit 32 corresponds to the function verification unit and the output suspension unit of the present invention, and is controlled by the encryption key switchover management unit 27. The output suspension control unit 32 transmits an encryption-key-switchover notification command to the AV data reception apparatuses 2 and 3 via the command transmission and reception unit 21 when an encryption key is to be switched to a different one.

Further, the output suspension control unit 32 verifies the functions of the AV data reception apparatuses 2 and 3 through a command response received in response to the encryption-key-switchover notification command. Since the AV data reception apparatus 3 does not support the encryption-key-switchover notification command, the output suspension control unit 32 controls one of the AV data transmission units 30 and 31 which has an output channel corresponding to the AV data reception apparatus 3, so that the controlled AV data transmission unit suspends the output of AV data.

Figure 4:
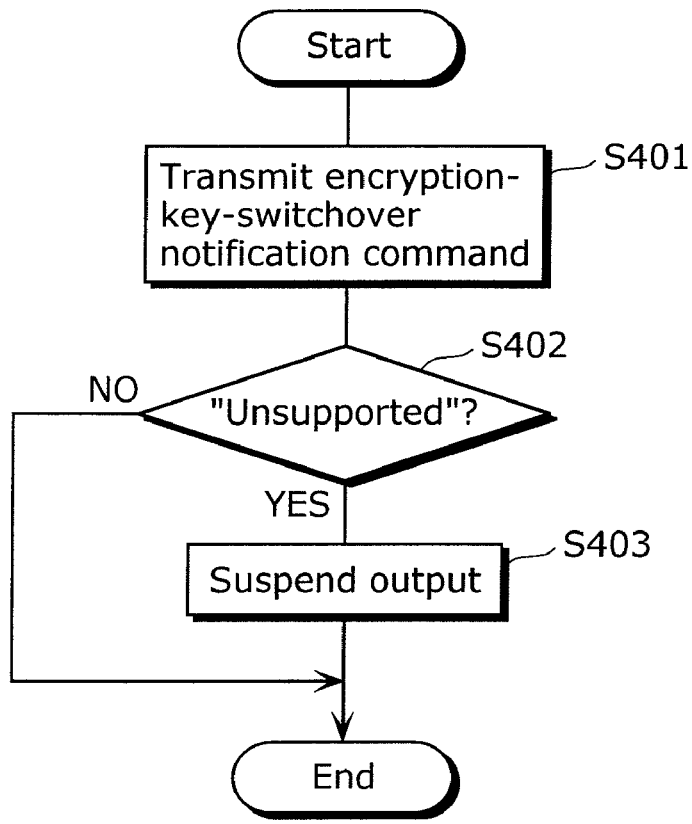
FIG. 4 is a flowchart illustrating processing of an output suspension control unit according to an embodiment of the present invention, performed when an encryption key is to be switched to a different one.

FIG. 4 is a flowchart illustrating processing of the output suspension control unit 32 performed when an encryption key is to be switched to a different one.

The output suspension control unit 32 transmits an encryption-key-switchover notification command to the AV data reception apparatuses 2 and 3 via the command transmission and reception unit 21 when an encryption key is to be switched to a different one (S401), and verifies the functions of the AV data reception apparatuses 2 and 3 through a command response received (S402). When one of the AV data reception apparatuses 2 and 3 does not support the encryption-key-switchover notification command, the output suspension control unit 32 controls one of the AV data transmission units 30 and 31 which has an output channel corresponding to that AV data reception apparatus, so that the controlled AV data transmission unit suspends the output of AV data (S403).

In this manner, the output suspension control unit 32 performs its processing when an encryption key is to be switched to a different one. That is, when an encryption key is to be switched to a different one, the output suspension control unit 32 selectively suspends the output of AV data through the output channel corresponding to the AV data reception apparatus 3 which does not support the encryption-key-switchover notification command.

<Operation of AV Data Transmission Apparatus>

The following is a description of the operation performed by the AV data transmission apparatus 1 having the above structure when it simultaneously transmits AV data to the AV data reception apparatus 2 and the existing AV data reception apparatus 3 which does not support new usage control information.

Figure 5:
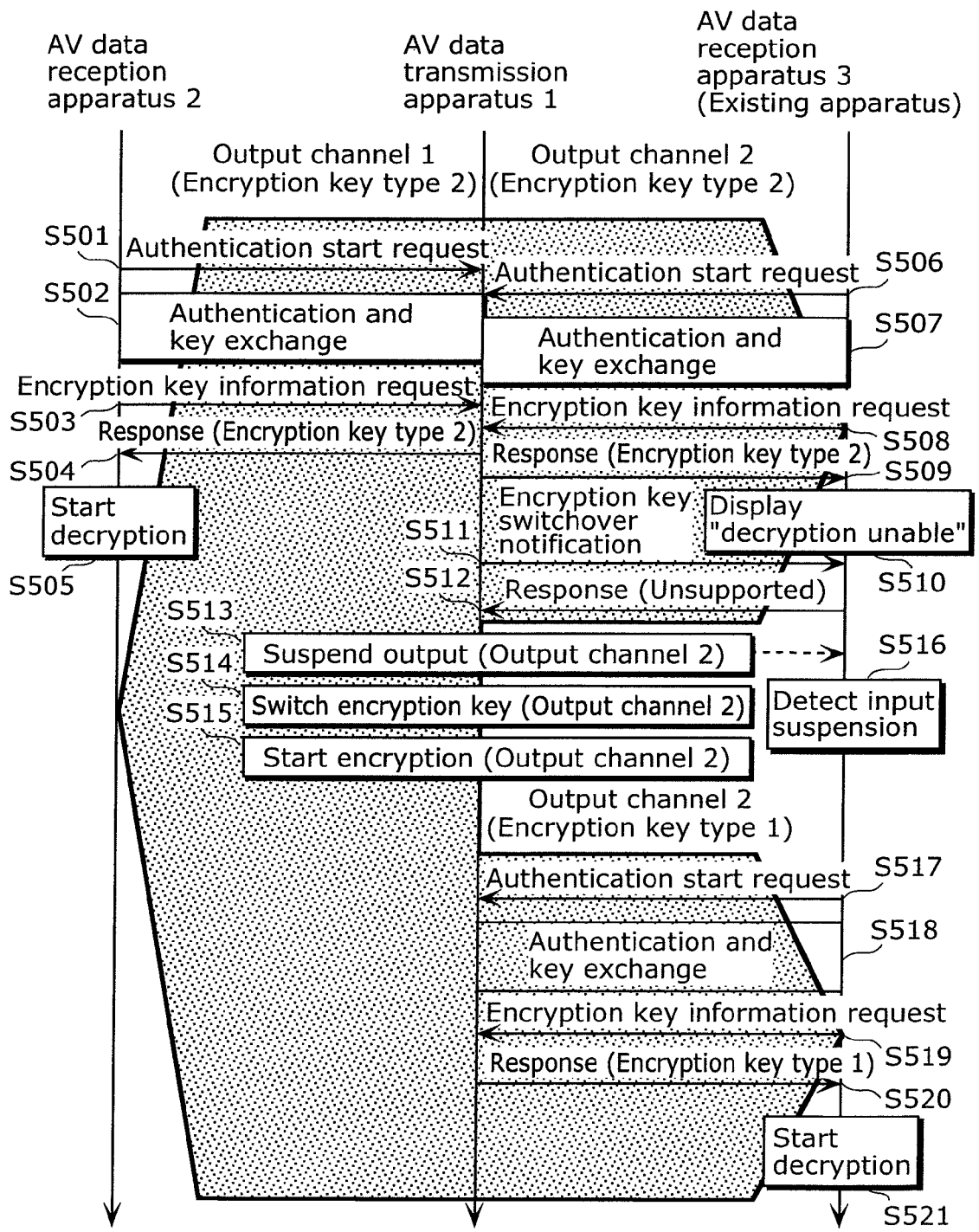
FIG. 5 illustrates an operation of an AV data transmission apparatus of an embodiment of the present invention, performed when an encryption key is to be switched to a different one.
Figure 6:
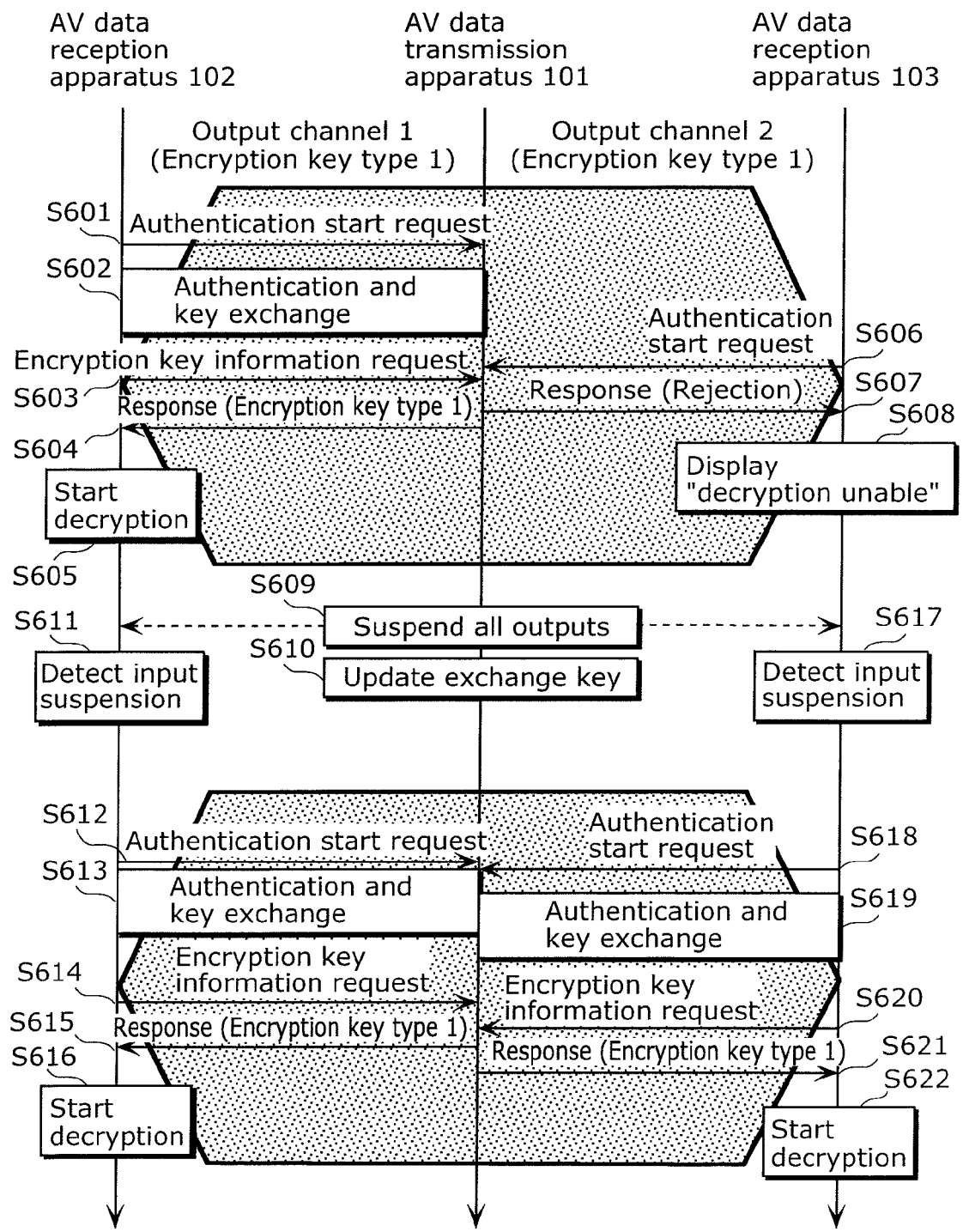
FIG. 6 illustrates an operation of switching an encryption key to a different one by switching an exchange key to a different one in AV data transmission according to a conventional copyright protection specification.
Figure 7:
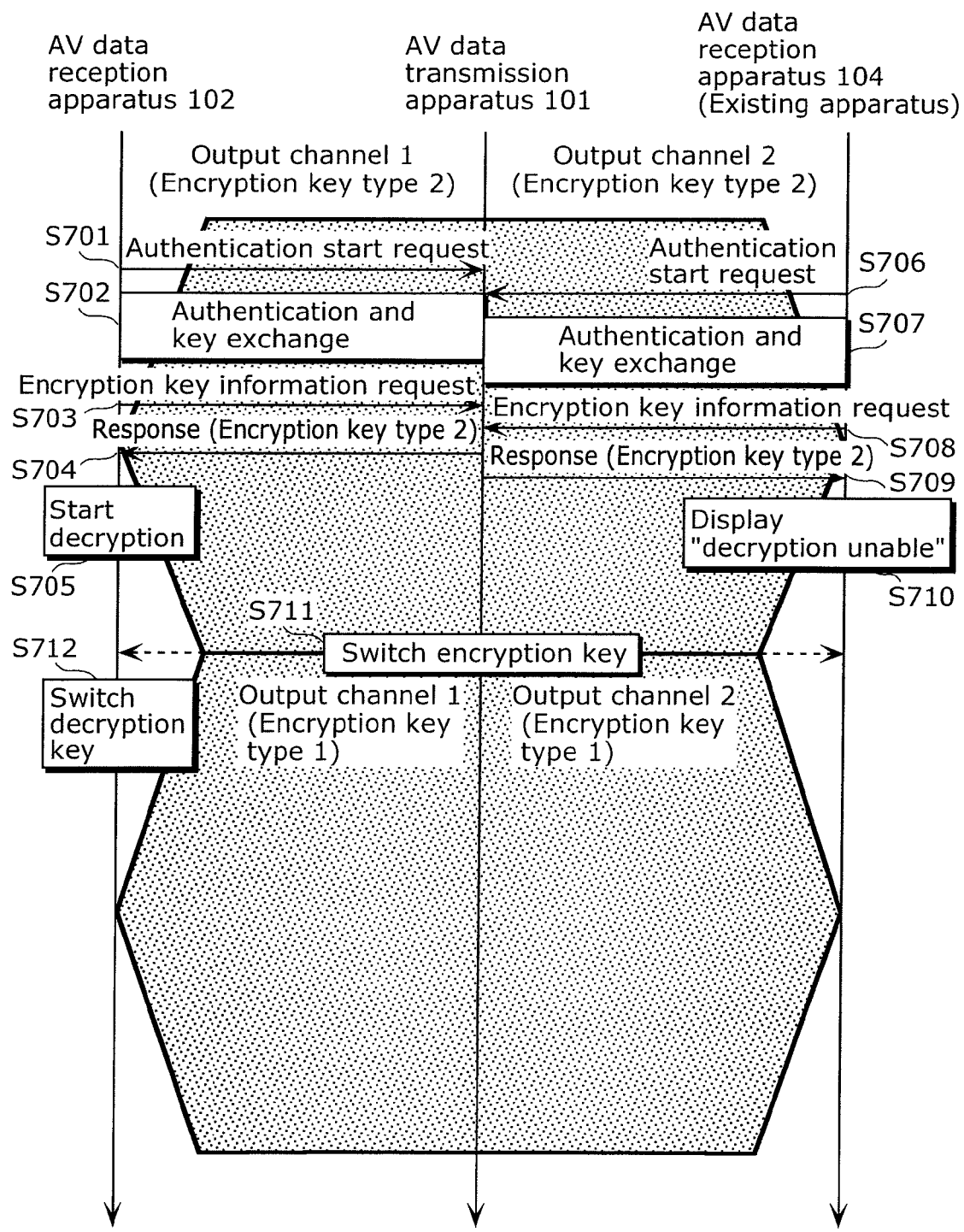
FIG. 7 illustrates an operation of switching among the types of encryption key used at each output channel in AV data transmission according to a conventional copyright protection specification.

FIG. 5 illustrates the operation of the AV data transmission apparatus of the present embodiment, performed when an encryption key is to be switched to a different one. FIG. 5 illustrates, with regard to an AV data transfer between the AV data transmission apparatus 1 and the AV data reception apparatuses 2 and 3, an operation performed at the time of switching the encryption key used at the output channel 2 from the encryption key of the encryption key generation scheme "encryption key type 2", under which the existing AV data reception apparatus 3 cannot perform decryption, over to an encryption key of the encryption key generation scheme "encryption key type 1", under which even the exiting AV data reception apparatus 3 can perform decryption.

Initially, the AV data transmission apparatus 1 encrypts AV data whose usage control information indicates "analog output prohibited", by using an encryption key of "encryption key type 2". Then, the AV data transmission apparatus 1 outputs the encrypted AV data to the AV data reception apparatus 2 through the output channel 1.

Next, upon receiving the encrypted AV data, the AV data reception apparatus 2 transmits an authentication start request command to execute authentication and key exchange and share an exchange key (S501, S502). Then, the AV data reception apparatus 2 transmits an encryption-key-information request command to the AV data transmission apparatus 1, obtains encryption key information (the encryption key type 2 in this case) through a command response from the AV data transmission apparatus 1 (S503, S504), and generates a decryption key to start decryption (S505).

The AV data transmission apparatus 1 encrypts AV data whose usage control information indicates "analog output prohibited", by using an encryption key of "encryption key type 2". Then, the AV data transmission apparatus 1 outputs the encrypted AV data to the AV data reception apparatus 3 through the output channel 2.

Here, the AV data reception apparatus 3 executes authentication and key exchange to share an exchange key (S506, S507). Then, the AV data reception apparatus 3 transmits an encryption-key-information request command to the AV data transmission apparatus 1, and obtains encryption key information through a command response from the AV data transmission apparatus 1 (S508, S509). The AV data reception apparatus 3 then verifies that the encryption key information obtained indicates "encryption key type 2" which the AV data reception apparatus 3 does not support, and thus displays "decryption unable" (S510).

Next, when the usage control information of AV data is switched from "analog output prohibited" to "analog output permitted", the AV data transmission apparatus 1 transmits an encryption-key-switchover notification command to the AV data reception apparatus 3 through the output channel 2 (S511) and verifies a command response received from the AV data reception apparatus 3 (S512). Since the command response from the AV data reception apparatus 3 indicates that the AV data reception apparatus 3 does not support the encryption-key-switchover notification command (unsupported), the AV data transmission apparatus 1 suspends the AV data output through the output channel 2 (S513). Subsequently, the AV data transmission apparatus 1 switches the current encryption type to "encryption key type 1" (S514) by which even the existing AV data reception apparatus 3 can perform decryption. The AV data transmission apparatus 1 then generates an encryption key to start encryption (S515) and resumes the AV data transmission through the output channel 2.

Upon detecting that the AV data input has been suspended (S516), the AV data reception apparatus 3 determines that the AV data transmission apparatus 1 may have updated the exchange key. After the AV data transmission apparatus 1 resumes the transmission, the AV data reception apparatus 3 executes authentication and key exchange to obtain an exchange key (S517, S518), and transmits an encryption-key-information request command to obtain encryption key information through a command response (S519, S520). Based on the encryption key information received, the AV data reception apparatus 3 verifies that the encryption key is of "encryption key type 1" which is supported by the AV data reception apparatus 3, and thus starts decryption (S521).

As described, the AV data transmission apparatus of the present embodiment selects only the output channel for which the encryption key is to be switched to a different one, and then suspends the output through the selected output channel before switching the encryption key to a different one. As a result, a switchover among the encryption keys is possible without suspending the output through the other output channel for which a switchover among the encryption keys is unnecessary. It is also possible to notify even the existing AV data reception apparatus that the encryption key may have been changed, thereby allowing the existing AV data reception apparatus to start decryption when the encryption key is switched to one that allows decryption.

Further, the AV data transmission apparatus of the present embodiment verifies whether or not the AV data reception apparatuses have a function to detect a switchover among the encryption key generation schemes. When there is an AV data reception apparatus which does not have the function, the AV data transmission apparatus suspends the AV data output through an output channel corresponding to that AV data reception apparatus. Consequently, the output continues for the AV data reception apparatus which has the function to detect a switchover among the encryption key generation schemes, and as a result, image continuation is possible.

As above, the present invention provides an AV data transmission apparatus and an AV data transmission method that allow an AV data reception apparatus which does not detect a switchover of an encryption key generation scheme to one that permits decryption, to start decryption. In addition, the present invention provides an AV data transmission apparatus and an AV data transmission method that allow a switchover among encryption keys without suspending output through an output channel for which an encryption key switchover is unnecessary.

It is to be noted that the present embodiment has illustrated the case where the usage control information indicates "analog output prohibited", but the usage control information is not limited to this, and may be any usage control information as long as it indicates a need to switch an encryption key to a different one.

Further, in the present embodiment, the AV data transmission apparatus 1 has a transmission function only, but it is apparent that it may have both a transmission function and a reception function.

Furthermore, in the present embodiment, the AV data transmission apparatus 1 verifies, using an encryption-key-switchover notification command, whether or not the AV data reception apparatuses 2 and 3 have a function to detect an encryption key switchover. However, the means for this verification is not limited to this, and a dedicated function-verification command may be provided.

Moreover, in the present embodiment, the AV data transmission apparatus 1 has plural AV data transmission units, but it is apparent that it may have a single AV data transmission unit capable of outputting AV data to plural units, connections, and channels simultaneously.

In addition, in the present embodiment, the AV data transmission units are controlled such that they suspend only the AV data output, but disconnection and the like may be further performed.

Further, the present embodiment has illustrated the case of employing IEEE 1394 as the home network, but the type of the home network is not limited to this, and a home network using Ethernet® or a wireless LAN may be adopted.

Furthermore, the present invention can be embodied not only as an apparatus as described above, but also as an integrated circuit having processing units of the apparatus, a system that includes the apparatus, and a method having steps of the processing units of the apparatus.

Although only an exemplary embodiment of this invention has been described in detail above in relation to the AV data transmission apparatus and the AV data transmission method of the present invention, the present invention is not limited this exemplary embodiment. Those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention is applicable to AV data transmission apparatuses and AV data transmission methods. It is particularly applicable to AV data transmission methods and AV data transmission apparatuses which have an output function with plural output channels, and encrypt and transmit AV data.

What is claimed is:

1. An AV data transmission apparatus including two or more output channels and transmitting encrypted AV data to a plurality of AV data reception apparatuses, each AV reception apparatus of the plurality of AV reception apparatuses corresponding to one output channel of said two or more output channels, said AV data transmission apparatus comprising:
   an encryption device encrypting AV data using an encryption key;
   an AV data transmission device transmitting the encrypted AV data to the plurality of AV data reception apparatuses through each output channel of said two or more output channels;
   an encryption key switching device selecting at least one output channel of said two or more output channels, and switching an encryption key used for encrypting the AV data to be transmitted through said selected at least one output channel;
   an output suspension device selecting, when a first AV data reception apparatus, of the plurality of AV reception apparatuses, which cannot decrypt encrypted AV data encrypted using a first encryption key switched to by said encryption key switching device is present, a first output channel, of said two or more output channels, corresponding to the first AV data reception apparatus, and suspending an output of the encrypted AV data transmitted through said selected first output channel; and
   a control device causing (i) said output suspension device to suspend the output of the encrypted AV data transmitted through said selected first output channel, and (ii) said encryption key switching device to switch the first encryption key, used for encrypting the AV data for which the output through said first output channel is suspended, to a second encryption key and then to transmit AV data encrypted using the second encryption key through at least said first output channel of said two or more output channels.

2. The AV data transmission apparatus according to claim 1, wherein said control device (i) causes said output suspension device to suspend the output through said first output channel, and then (ii) disconnects from the first AV data reception apparatus which corresponds to said first output channel.

3. The AV data transmission apparatus according to claim 1, further comprising a function verification device verifying whether or not the plurality of AV data reception apparatuses detects that the encryption key has been switched,
   wherein said control device causes said output suspension device to not suspend the output of the encrypted AV data, which has been encrypted using the first encryption key, through a second output channel, of said two or more channels, which corresponds to a second AV data reception apparatus, of the plurality of AV apparatuses, for which said function verification device verifies that the first encryption key has been switched.

4. An AV data transmission method for transmitting, through two or more output channels, encrypted AV data to a plurality of AV data reception apparatuses, each AV reception apparatus of the plurality of AV reception apparatuses corresponding to one output channel of the two or more output channels, said AV data transmission method comprising:
   encrypting AV data using an encryption key;
   transmitting the encrypted AV data to the plurality of AV data reception apparatuses through each output channel of the two or more output channels;
   switching, by selecting at least one output channel of the two or more output channels, an encryption key used for encrypting the AV data to be transmitted through the selected at least one output channel;
   suspending, by selecting, when a first AV data reception apparatus, of the plurality of AV reception apparatuses, which cannot decrypt encrypted AV data encrypted using a first encryption key switched to by said switching is present, a first output channel, of the two or more output channels, corresponding to the first AV data reception apparatus, an output of the encrypted AV data transmitted through the selected first output channel; and
   causing (i) said suspending to suspend the output of the encrypted AV data transmitted through the selected first output channel, and (ii) said switching to switch the first encryption key, used for encrypting the AV data for which the output through the first output channel is suspended, to a second encryption key and then to transmit AV data encrypted using the second encryption key through at least the first output channel of the two or more output channels.

5. The AV data transmission apparatus according to claim 3, wherein the AV data encrypted using the second encryption key and to be transmitted through said first output channel and the AV data encrypted using the first encryption key and to be transmitted through said second output channel are the same AV data.

* * * * *